United States Patent
Cote et al.

(12)

(10) Patent No.: US 6,214,231 B1
(45) Date of Patent: Apr. 10, 2001

(54) SYSTEM FOR OPERATION OF MULTIPLE MEMBRANE FILTRATION ASSEMBLIES

(75) Inventors: Pierre Lucien Cote, Dundas; Arnold Frederic Janson; Steven Kristian Pedersen, both of Burlington; Steven Ian Low, Mississauga, all of (CA)

(73) Assignee: Zenon Environmental Inc., Oakville (CA)

( * ) Notice: Subject to any disclaimer, the term of this patent is extended or adjusted under 35 U.S.C. 154(b) by 0 days.

(21) Appl. No.: 09/384,638

(22) Filed: Aug. 27, 1999

(51) Int. Cl.[7] .................................................. B01D 65/02
(52) U.S. Cl. .......................... 210/636; 210/637; 210/650; 210/741
(58) Field of Search .................................. 210/90, 321.69, 210/321.79, 321.8, 321.88, 321.89, 333.01, 340, 341, 636, 650, 741, 637, 791; 264/451

(56) References Cited

U.S. PATENT DOCUMENTS

| | | | | |
|---|---|---|---|---|
| 5,084,220 | * | 1/1992 | Moller .................................. | 264/45.1 |
| 5,248,424 | * | 9/1993 | Cote et al. ............................ | 210/636 |
| 5,403,479 | * | 4/1995 | Smith et al. .......................... | 210/636 |
| 5,607,593 | * | 3/1997 | Cote et al. ............................ | 210/636 |
| 5,620,605 | * | 4/1997 | Moller .................................. | 210/650 |
| 5,639,373 | * | 6/1997 | Mahendran et al. ................. | 210/636 |
| 5,643,455 | * | 7/1997 | Kopp et al. ........................... | 210/636 |
| 5,783,083 | * | 7/1998 | Henshaw et al. ..................... | 210/636 |
| 6,045,698 | * | 4/2000 | Cote et al. ............................ | 210/636 |

FOREIGN PATENT DOCUMENTS

| | | |
|---|---|---|
| 19734759 | 8/1997 | (DE) . |
| 10397 | 11/1997 | (DE) . |

* cited by examiner

Primary Examiner—Joseph W. Drodge
(74) Attorney, Agent, or Firm—Alfred D. Lobo (57) ABSTRACT

Limitation of the number of cassettes in an assembly currently used for the production of permeate is obviated by grouping plural cassettes into racks one or more of which may be isolated while permeate production from the remaining racks is uninterrupted. Ancillary functions such as backpulsing, chemical cleaning and testing for defects in membranes ("integrity testing") in one or more racks may proceed while production of permeate continues. The number of racks in a bank is determined by the period of the overall filtration cycle, typically 15 min, in which filtration period the ancillary period is a minor portion, typically 30 sec. The racks make it possible to use automatic on/off valves which open and close quicker than larger ones. The resulting saving in time, energy, and equipment costs, which when back-pulsing with permeate is surprisingly economical, is even greater when a chemical cleaning solution is to be used. In addition, the saving in cost of equipment and avoiding the wear and tear of pumps which are intermittently stopped and started, produces unexpected economic benefits. For even greater savings in operating costs, a bank of cassettes, or a bank of racks may be operated with a "gravity flow" system.

22 Claims, 7 Drawing Sheets

SYSTEM FOR OPERATION OF MULTIPLE MEMBRANE FILTRATION ASSEMBLIES

FIELD OF THE INVENTION

This invention relates to a commercial filtration plant in which multiple "modules" of immersed membranes such as hollow fiber membranes ("fibers") are efficiently and frequently back-flushed (back-washed or back-pulsed) to maintain an economical operating flux; in addition, less frequently, the fibers are chemically cleaned and tested for integrity. A "module" is represented by a "skein" of fibers potted so as to be able to collect permeate (filtrate) filtered into their lumens from a contaminated liquid substrate in which the module or skein is immersed.

BACKGROUND OF THE INVENTION

To date, commercial filtration of a large quantity of liquid substrate, specifically contaminated water, using immersed fiber membranes, has been prejudiced by the capital cost of construction of a large plant, that is, one for production of at least 3.785 million liters/day (MM L/day) or 1 million gallons per day (MM gal/day) of permeate, and the cost of its operation. To produce permeate efficiently, that is, economically, a skein must be back-pulsed frequently; the more contaminated the substrate, the more frequent the back-pulsing. Because skeins are typically back-flushed several times an hour, and permeate is forced through the fibers during back-flushing during a very short period at a flow rate greater than the rate at which permeate is withdrawn, back-flushing is referred to as "back-pulsing". Fibers may be back-pulsed with water, or gas, typically air, or a mixture of air and water. Filtering municipal sewage, "dirty" river water and the like, may require back-pulsing every 15 min. In a typical commercial filtration plant, a tank is continuously fed with contaminated water; permeate is recovered and concentrate in which the contaminants are concentrated (typically 0.1% to 15% solids) is purged from the tank.

In a conventional filtration plant, multiple modules or skeins are connected for operation in parallel, as if a single skein; and each cassette is provided with an on/off valve on its permeate and back-pulse manifolds respectively, to isolate it from other cassettes, if for example a skein becomes defective and the cassette is to be replaced. On/off valves which are fully open or fully closed are referred to herein because there is no reason to have valves which may be partially opened, and on/off valves are cheaper and operate more quickly. By "isolate" is meant that one or more cassettes is hydraulically disconnected from the permeate collection header for the remaining cassettes. If desired, more than one, but less than all the skeins may be so isolated, at relatively frequent intervals for executing an ancillary function. Functions other than filtration are referred to as "ancillary functions". An ancillary function is typified by back-pulsing with permeate, chemically cleaning with a chemical solution, or integrity testing (to detect a leak referred to as "an integrity test"). To avoid manually turning valves on and off, automatic on/off valves may be used to serve their designed purpose.

Back-flushing with permeate requires flowing it through the lumens of the fibers at sufficient pressure to pass through the pores of the membranes; preferably the pressure is sufficiently high and generated quickly enough to provide a "pulse" which effectively dislodges a build-up of material ("foulant") which may foul and plug the pores. Since skeins are usually back-flushed often, it is desirable to back-flush one skein while the others produce permeate. Though there is no saving in time compared to operating the entire bank as a single skein, since each skein is isolated for the same amount of time irrespective of whether the bank is operated as a single skein, such a procedure allows close control of each skein in the bank. For example, over a 100 cycles, each skein is back-pulsed 100 times. The total time each skein spends being back-pulsed is the same whether all skeins are operated as a single skein or not.

Figure 1:
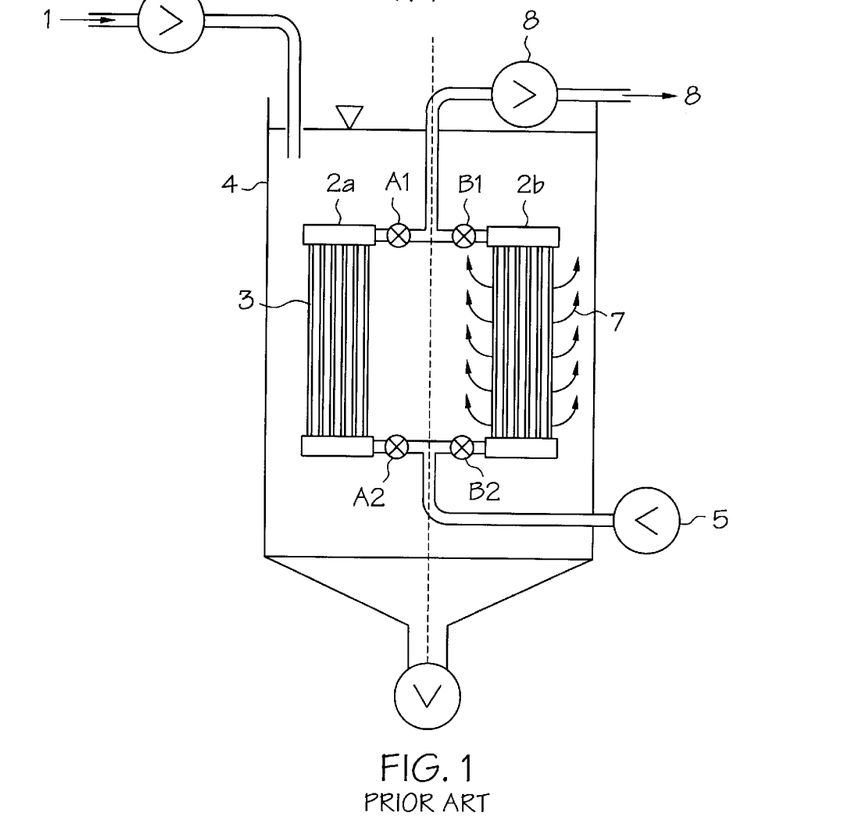
FIG. 1 is a prior art configuration of a cluster of two skeins.

A procedure for simultaneously back-flushing one skein while withdrawing permeate from others in a bank or cluster of skeins is disclosed in German Beschreibung No. 10397/6.11.97 to Prof Chmiel. In his FIG. 1 (reproduced in FIG. 1 herein with valves added) he discloses a tank 4 in which is immersed a cluster of two skeins 2a and 2b of membranes 3 from which permeate is withdrawn at outlet 6. Permeate leaves from the skeins' upper headers through a permeate withdrawal manifold connected to the suction of a permeate withdrawal pump ("permeate pump") 8; their lower headers are connected to the discharge of a back-washing pump ("back-pulse pump"). In this configuration, permeate can only be withdrawn from one direction (from the upper header is shown), and the skein can only back-pulsed in the same direction as permeate is withdrawn, that is by back-pulsing through the lower headers. In a skein with relatively long fibers, that is greater than 0.5 meter, it may be desirable to withdraw permeate from both the upper and lower headers for efficiency; and this cannot be done with the FIG. 1 configuration. Skein 2a is provided with upper and lower automatic on/off valves A1 and A2 respectively, and skein 2b is provided with upper and lower automatic on/off valves B1 and B2 respectively. Thus to operate the two skeins he requires four on/off valves. A machine program switches valving as required to withdraw peremate from one skein while the other is being back-pulsed as follows: when both skeins are in the production mode, valves A1 and B1 are open and valves A2 and B2 are closed; when skein 2b is to be back-pulsed, valve B1 is closed and valve B2 is opened. Back-pulse pump 9 introduces permeate though inlet 5 into the lower header of skein 2b and the permeate is discharged through the membranes at 7 into the water in the tank. After skein 2b is adequately back-pulsed, it is reconnected by opening valve B1 and closing valve B2; simultaneously valve A1 is closed and valve A2 is opened so skein 2a is back-pulsed.

Figure 2:
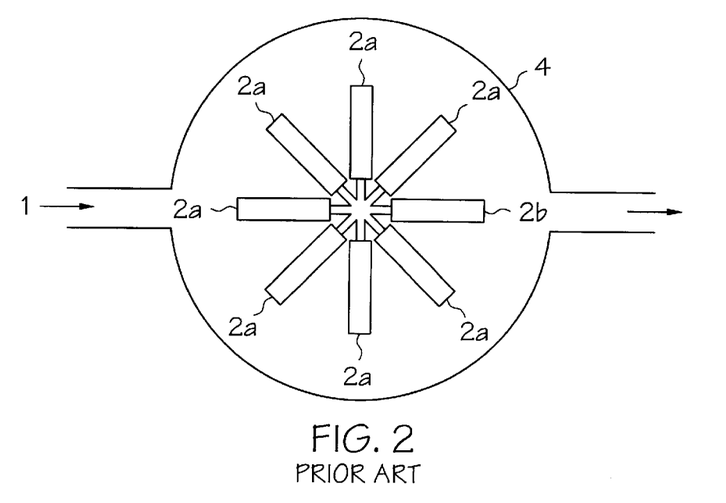
FIG. 2 is a prior art configuration of a cluster of eight radially disposed skeins connected so as to allow any one to be isolated while the others produce permeate.

In FIG. 2 (reproduced herein), a top plan view, Chmiel illustrates 8 skeins in a radial cluster, and one skein 2b is back-washed while the other skeins 2a produce permeate. After 2b is back-washed, it is re-connected to produce permeate and another skein is back-washed. As in FIG. 1 each skein has an upper and lower valve (not shown) and permeate is withdrawn from the top header of the skein while back-washing with permeate or chemical cleaning is carried out through its bottom header.

Because the emphasis in Chmiel is on control of each skein, he failed to realize that he may have been able to operate multiple clusters of skeins without valving the skeins, but valving the cluster, and thus save on the number of valves. The possibility of using multiple clusters did not arise because his goal was to control each skein, not to operate a large commercial filtration plant.

A "cassette", like a cluster, comprises plural modules (skeins) each having opposed upper and lower headers, from at least one of which is discharged permeate in open fluid communication with other headers, the skeins being connected for operation in parallel. Conduits from headers of individual skeins in a cassette are not valved. Each skein is in open fluid communication with a cassette manifold. Preferably a cassette has both an upper and a lower CPM which also functions as a manifold for back-pulsing and chemical cleaning. A cassette is a "movable operating unit" which can be installed in a plant without handling individual skeins. A cassette affords no control over a single skein but facilitates handling, installing and operating multiple skeins as if the cassette were a single skein. A cassette has from 2 to about 40 skeins, depending upon the number of fibers in the skein and theri length. A cassette of long fiber skeins preferably has from 4 to 15, and most preferably from 6 to 12 skeins. In a cassette of vertical skeins, each having upper and lower headers, permeate may be withdrawn from both the upper and lower headers, or only one; similarly, a cassette may be back-pulsed through both the upper and lower headers, or only one.

An assembly of cassettes is referred to as a "bank" or "train" of cassettes. A bank of cassettes may be operated as a single cassette. A pump may be used to withdraw permeate from the CPM; the same, or another pump may be used to execute an ancillary function.

Even distributing cassettes evenly on either side of a suction line of a cassette permeate manifold ("CPM"), operation of a bank of from 12 to 16 cassettes as a single cassette, results in such a difference in pressure drops between cassettes connected at opposed ends of the CPM and cassettes near the middle, that it greatly affects efficiency both with respect to permeate withdrawal and also to back-pulsing. The term CPM is used specifically for the permeate manifold; the cassette back-pulse manifold is referred to as "CBPM"; and the two together are referred to as "cassette manifolds". It will be understood that, as used herein, CPM and CBPM refer to manifolds which place each cassette in fluid communication with a permeate pump and a back-pulse pump respectively.

Moreover it was not possible to operate other cassettes in the bank while one was being replaced, so that one was required to wait until the cassette was isolated to re-commence operation with the rest of the bank.

SUMMARY OF THE INVENTION

It has been discovered that, in a large filtration plant, by grouping plural modules (or skeins) of hollow fiber membranes for microfiltration (MF) or ultrafiltration (UF) in a cassette, without selectively isolating one or more, but less than all skeins in the cassette, one can economize on the number of valves used, and allow efficient use of skeins having fibers >0.5 meter long; permeate is withdrawn from both headers of a skein; and back-pulsing liquid is introduced into both headers of a skein. Individual skeins are not provided with automatic on/off valves ("AVs" for brevity). Only the cassette manifold(s) is provided with an AV. Permeate is withdrawn continuously from the bank of cassettes while back-pulsing at least one, but less than all of them, preferably less than half of them, during predetermined back-pulse modes. It is thus possible to generate substantial efficiency and savings in operating the filtration plant. The simple but critical step of grouping modules or skeins into cassettes, each with two AVs, allows efficient and accurate testing for integrity of individual membranes when an isolated cassette is tested. This may be accomplished as often as once a day.

It has also been discovered that for an even larger plant, by grouping plural cassettes in "racks" without selectively isolating one or more, but less than all cassettes in the rack, and providing appropriate AVs on the manifolds of these racks, it is possible to generate even greater efficiency and savings than when skeins are grouped into cassettes. A rack is an "immovable operating unit" which is assembled in the field. A rack affords no control over a single cassette but is unexpectedly found to permit accurate integrity testing of all cassettes in the rack.

It is therefore a general object to provide a membrane filtration system comprising an assembly of at least 100 immersed modules of fibers, e.g. vertical skeins each having a membrane area of at least 10 m$^2$, grouped in cassettes each having from 4 to 30 skeins for operation in parallel in a "bank of cassettes". Unexpectedly economic operation may be achieved with only two AVs valves on each cassette manifold. The number of skeins in a cassette is limited by the ability to test a cassette for integrity ("integrity test"). The number of cassettes in a bank is limited by the time required for each portion of a complete cycle of permeate withdrawal and back-pulsing.

It is also a general object to provide a membrane filtration system comprising an assembly of multiple cassettes, preferably from 2 to 20, grouped in "racks"; plural racks, in turn, are connected for operation in parallel as a "bank of racks". The number of racks in a bank is limited by the time required for each portion of a complete cycle of permeate withdrawal and back-pulsing. It is essential that multiple, automatically actuated on/off valves be used in combination with means to selectively open and close the valves so as to obtain the desired control of operation of the bank; and, unexpectedly such operation may be achieved with only two automatic on/off rack valves on each RPM.

Both cassette AVs and rack AVs are relatively small even for a plant producing 5.284 MM L/day (20 MM gal/day) of filtrate, which plant would typically be constructed with multiple parallel banks (whether of cassettes or racks) to provide operating redundancy. Such valves are relatively inexpensive to purchase and to maintain in operation; and using only two large valves per cassette manifold or rack manifold allows a large plant to be built and operated economically.

It is a specific object of this invention to provide a grouping of skeins in a cassette, or cassettes in a rack, which allows one to obtain highly reliable results pertaining to defects in any individual membrane in a module or skein. Particularly in a grouping of plural cassettes as a "rack", they are simultaneously tested after the rack is isolated. Testing may be carried out for a relatively long time, in the range from 10 min to 1 hr, while continuing to operate those racks which are not isolated in the permeate production mode.

It is a specific object of this invention to provide a rack of plural cassettes which produce permeate and discharge it under gravity into a wet well. Flow of permeate from modules is started in the rack's manifold by generating a vacuum in it, and once started, the flow of permeate is self-regulating. Multiple racks may be operated with a single vacuum generating means in fluid communication with a main manifold, a single large rack valve in each rack manifold, and a single back-pulse on/off valve in a back-pulse conduit to each rack manifold.

Other specific objects of this invention include the following: (a) to separate the primary filtration function of the membranes and the ancillary functions by isolating a cassette or rack for any particular ancillary operation, and to do so using AVs to isolate the cassette or rack; (b) to operate a permeate pump continuously so that production of permeate in a bank is not stopped; (c) to operate a back-pulse pump essentially continuously, depending upon the number of cassettes or racks in a bank and the period of an ancillary function in the filtration cycle of a single rack; (d) to use no more than two AVs per cassette or rack, each having an opening/closing cycle less than 30 sec.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

For a large filtration plant having a permeate production in the range from about 3.785 to 18.925 MM L/day (1 to 5 MM gal/day) a method for filtering contaminated fluid through a multiplicity of membrane modules in fluid communication with each other and connected for operation in parallel in a bank, comprises, grouping multiple modules in a cassette without providing valves on conduits connecting skeins in the cassette; connecting multiple cassettes in a bank of cassettes; sequentially isolating at least one cassette, typically from about 6 to 50 percent of cassettes in the bank, for a predetermined period of time sufficient to flow a back-pulsing fluid through the modules; and, continuously withdrawing permeate from cassettes not isolated for an ancillary function.

For a larger filtration plant having a permeate production in the range from about 18.925 to 189.25 MM L/day (5 to 50 MM gal/day) filtration comprises, grouping multiple cassettes in a rack; connecting multiple racks in a bank of racks; sequentially isolating at least one rack, typically from about 6 to 50 percent of racks in the bank, for enough time to flow a back-pulsing fluid through the modules; and, continuously withdrawing permeate from racks not isolated for an ancillary function.

Multiple cassettes are constructed with vertical skeins of fibers such as are described in U.S. Pat. Nos. 5,914,039; 5,783,083; 5,472,607; and 5,639,373 to Mailvaganam Mahendran et al, and the references cited therein. In such skeins, permeate is withdrawn into a skein discharge line and then into a CPM. Each skein in a cassette is simultaneously back-flushed with permeate at regular predetermined intervals during which permeate withdrawal from those cassettes is necessarily discontinued. More than once a month, and preferably in the range from once a day to once every week, the fibers are back-flushed with an aggressive chemical cleaning solution the composition of which is chosen to destroy foulant deposited on the outer surface of the fibers. Typically a dilute solution of sodium hypochlorite is used.

Only in a large filtration system where a bank comprises at least 100 modules or skeins, and typically more than 12 cassettes, does an unexpected economic benefit derive from grouping the cassettes in plural "racks". Such grouping, in turn, derives from the realization that the capital cost of a large plant, and the cost of its maintenance determine whether the plant is built. Grouping cassettes into racks permits using fewer automatic on/off valves than required if the same number of cassettes were connected individually so that each may be independently isolated. In a smaller plant operating a bank of cassettes may be economical. Fewer valves translates into lower capital costs, and lower maintenance costs. These factors become surprisingly significant in a large filtration plant where economics are critical.

In a particular large filtration plant with multiple racks in a bank, permeate from several cassette manifolds is collected in the rack's permeate manifold ("rack permeate manifold") ("RPM"); and flow from multiple RPMs is combined in the main permeate manifold ("MPM") or suction to the permeate pump. The diameters of the manifolds are progressively larger, the skein's header discharge line being the smallest, the CPM being larger, the RPM being still larger, and the MPM being the largest. This system utilizes automatic control valves and separate pumps—one pump to withdraw permeate and the other to provide the backwash. The key to operation of the novel system is the grouping of cassettes into racks, each comprising multiple cassettes, and the use of fewer automatic on/off valves on the racks than would be required in the prior art system. Sequencing fewer valves provides a saving in down-time, permitting more permeate production time. Carrying out an ancillary function on a rack of cassettes instead of an individual cassette may provide the difference as to whether a plant will be economical.

All required operating functions may be performed on all cassettes in the entire bank simultaneously. Because back-pulsing, maintenance cleaning and testing for integrity are to be performed frequently, the economics of doing this are critical. Cassettes are back-pulsed several times an hour; they are chemically cleaned as often as several times a day; and they may be tested for integrity every day. To perform an integrity test, the lumens of the fibers are pressurized with air to a predetermined set-point, typically 20–69 kPa (3–10 psi). Whether a skein passes the integrity test is determined by the measured rate at which the pressure decreases ("pressure decay") over a fixed time interval, typically 1–15 min.

Operation of a bank of cassettes in a tank is analogous to the operation of a single cassette. Preferably both, For a skein with relatively long fibers, typically about 2 meters long, upper and lower headers of each skein are manifolded to a CPM to withdraw permeate for more efficient operation than withdrawal of permeate from only one header. A permeate pump provides desired negative pressure ("vacuum") for optimum operation of the cassette. After operation for a chosen period from about 1 min to 30 min, typically 15 min, a single cassette is isolated and withdrawal of "production permeate" from that cassette is stopped. A separate back-pulse pump draws permeate from a separate "back-wash or back-pulse" tank, then forces permeate through the lumens of the fibers for a chosen period less than 1 min, typically 30 sec, excluding the time required to open and close the required valves. The back-pulsing is then stopped, the cassette is then reconnected to the bank by opening the shut-off valves which had earlier isolated it, and permeate withdrawal for production is re-started.

In the novel filtration plant cassettes may have only two AVs per cassette, as described below, to collect permeate in a CPM. Operation of a prior art plant where only two automatic valves are used on a bank of cassettes, is explained in greater detail below.

If the entire bank of cassettes is back-pulsed simultaneously, the valves for isolating a cassette are left open unless the cassette is to be removed and replaced.

It is essential to note that sizing the cassette manifold is determined by the required back-pulse flow because this is typically in the range from about 12 to 3 times, preferably from 1.5 times to twice the flow of withdrawn permeate. Therefore it is essential to decide whether ancillary functions will be carried out by isolating an individual cassette, or on all cassettes simultaneously.

Figure 3:
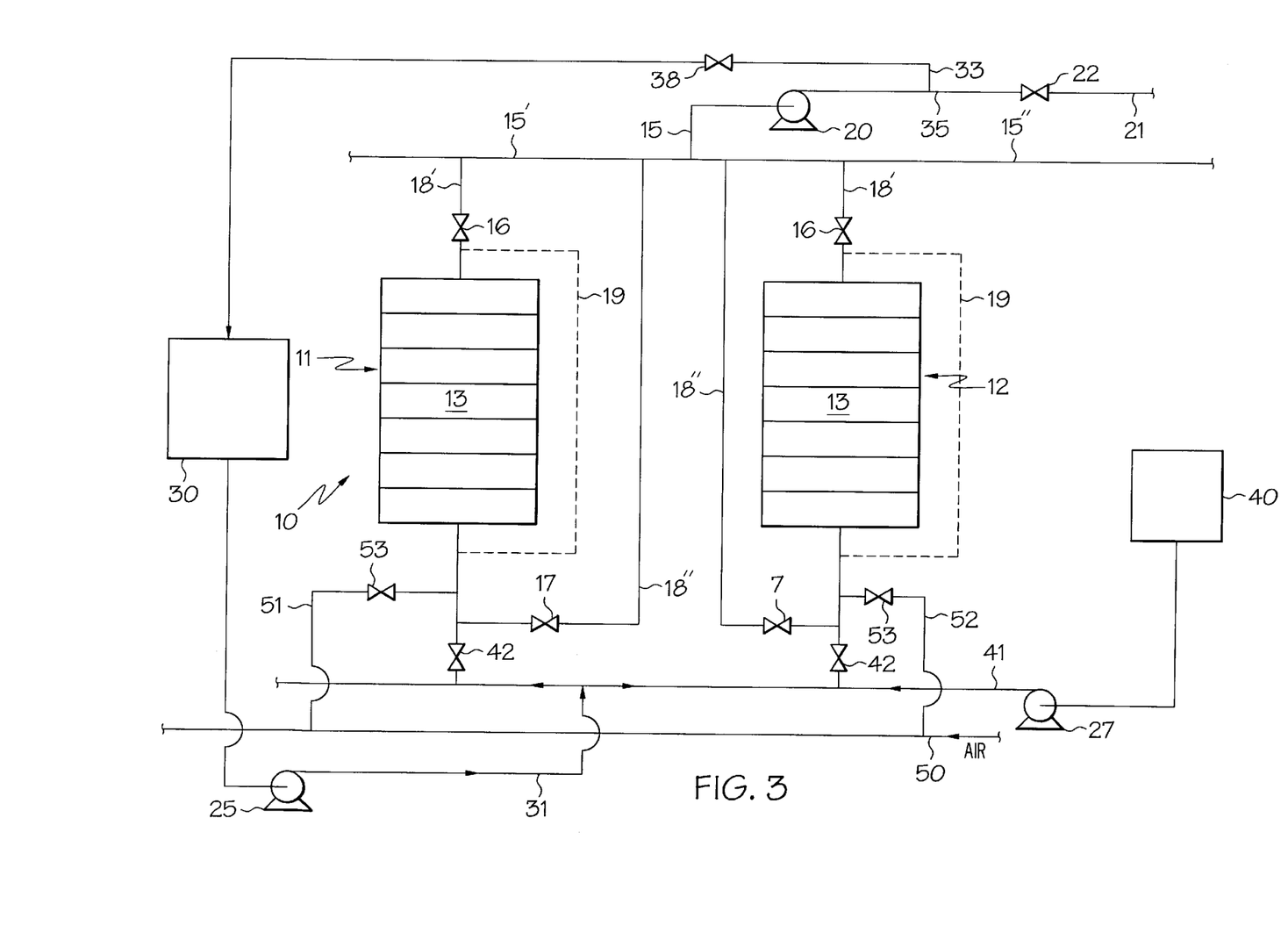
FIG. 3 is plan view schematically illustrating a configuration of cassettes in a large filtration plant, only two of the cassettes being shown connected for operation in parallel; the lumens of the membranes are in fluid communication with a CPM through which permeate is intermittently withdrawn. A cassette is isolated when it is to be back-pulsed, or to have some other ancillary function carried out.
Figure 4:
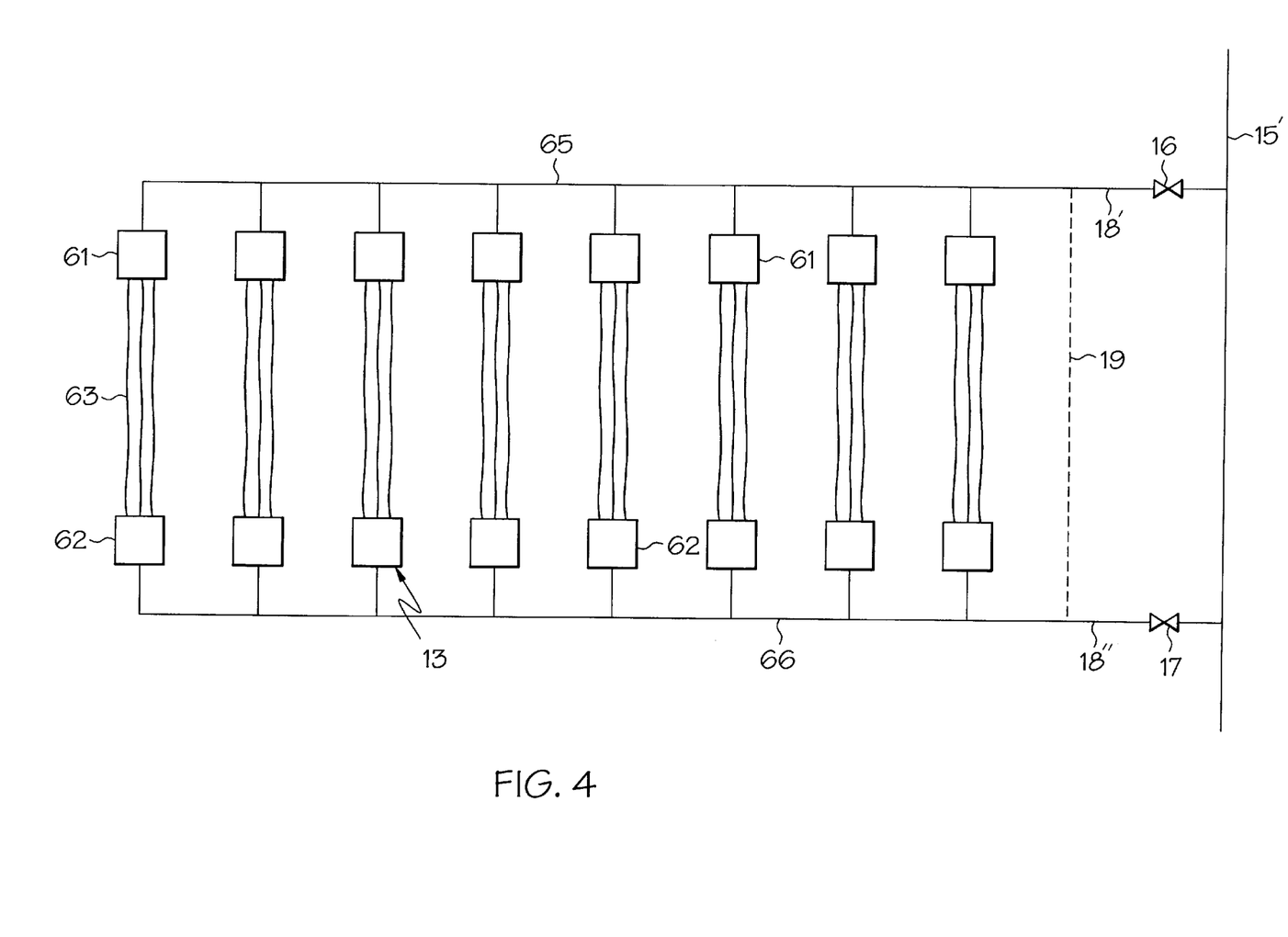
FIG. 4 is an elevational view schematically illustrating plural modules of hollow fibers in a cassette.

Referring to FIGS. 3 and 4 there is schematically illustrated a bank, indicated generally by reference numeral 10, of multiple cassettes, only two of which, 11 and 12 are shown. Each cassette comprises multiple skeins 13 (8 are shown in FIG. 2) of fibers 63 producing permeate which is collected from upper and lower headers 61, 62 of the skein in upper and lower permeate manifolds 65 and 66 respectively. Upper permeate manifolds 65 are connected to a CPM 18'; lower permeate manifolds 66 are connected to a CPM 18"; and the CPMs 18' and 18" of each cassette are connected to branches 15' and 15" respectively of the MPM 15. When long fibers in the range from 1 to 3 meters long, are used, permeate is withdrawn from both ends as shown in FIG. 2. AVs 16 and 17 allow one to isolate either cassette for an ancillary function while the other cassettes are in a permeate production mode. Less desirably, permeate from the lower ends of the fibers may be withdrawn through CPM 19 (shown in phantom outline) and teed into CPM 18' beneath valve 16. Cassette 12 is valved in a manner analogous to cassette 11. The remaining cassettes are similarly valved and connected at either end of the branches 15' and 15" and in the production mode, manifold 15 is the suction line to permeate withdrawal pump 20. Permeate from the pump may be returned to back-pulse tank 30 through conduit 33 when valve 38 is opened. When valve 38 is closed, permeate is sent through conduit 21 to the distribution network from the filtration plant.

In a plant having 16 cassettes connected, 7 cassettes would be connected for parallel operation on either side of the two, 11 and 12, shown.

For back-pulsing a cassette, permeate is withdrawn by back-pulse pump 25 from a back-pulse tank 30 and led to each cassette through back-pulse conduit 31 branches of which lead to each CPBM through on-off valves 32. If the fibers are to be back-pulsed with air, an air line is provided with on/off valves.

For chemical cleaning, one may choose to clean all cassettes sequentially at some predetermined interval, perhaps once a week. To do so, permeate in the back-pulse tank 30 is replaced with a chemical cleaner which is then pumped through the lumens of the fibers for a period sufficient to accomplish the desired cleaning. When all the cassettes are cleaned, the chemical cleaner is replaced with permeate.

For greater flexibility in chemically cleaning the modules in each cassettes it is desirable to have a separate chemical cleaning tank 40 from which cleaning solution is pumped by chemical cleaning pump 27 through discharge line 41 by opening chemicals valve 42 after the cassette is isolated.

It is not immediately evident that, in a large plant, the cost of automatic valves on each cassette contribute to the construction of an expensive plant.

For integrity testing, air pressure is provided by flow of air through an air line 50 which is split to be connected through air lines 51 and 52 to each CPM. Air lines 51 and 52 are each provided with automatic valves 53 to pressurize a cassette after it is isolated. The rate at which pressure decreases is measured and if too great, the defective fiber(s) is identified and plugged.

A "bank" includes at least two racks, typically 4 to 12; each rack preferably includes from 4 to 16, typically 8 to 12 cassettes. If a "rack" included only a single cassette, they would be one and the same. Each "cassette" preferably includes 6 to 15, preferably about 8 modules or skeins. Each skein may have a membrane filtration area in the range from about 10 to 100 $m^2$. Permeate from each of the modules is collected in a "skein permeate manifold" and flowed into the "cassette permeate manifold". In the novel system, at least two cassettes are grouped into a rack which collects permeate in a RPM and the RPMs in the bank collectively flow permeate into the main manifold.

Figure 5:
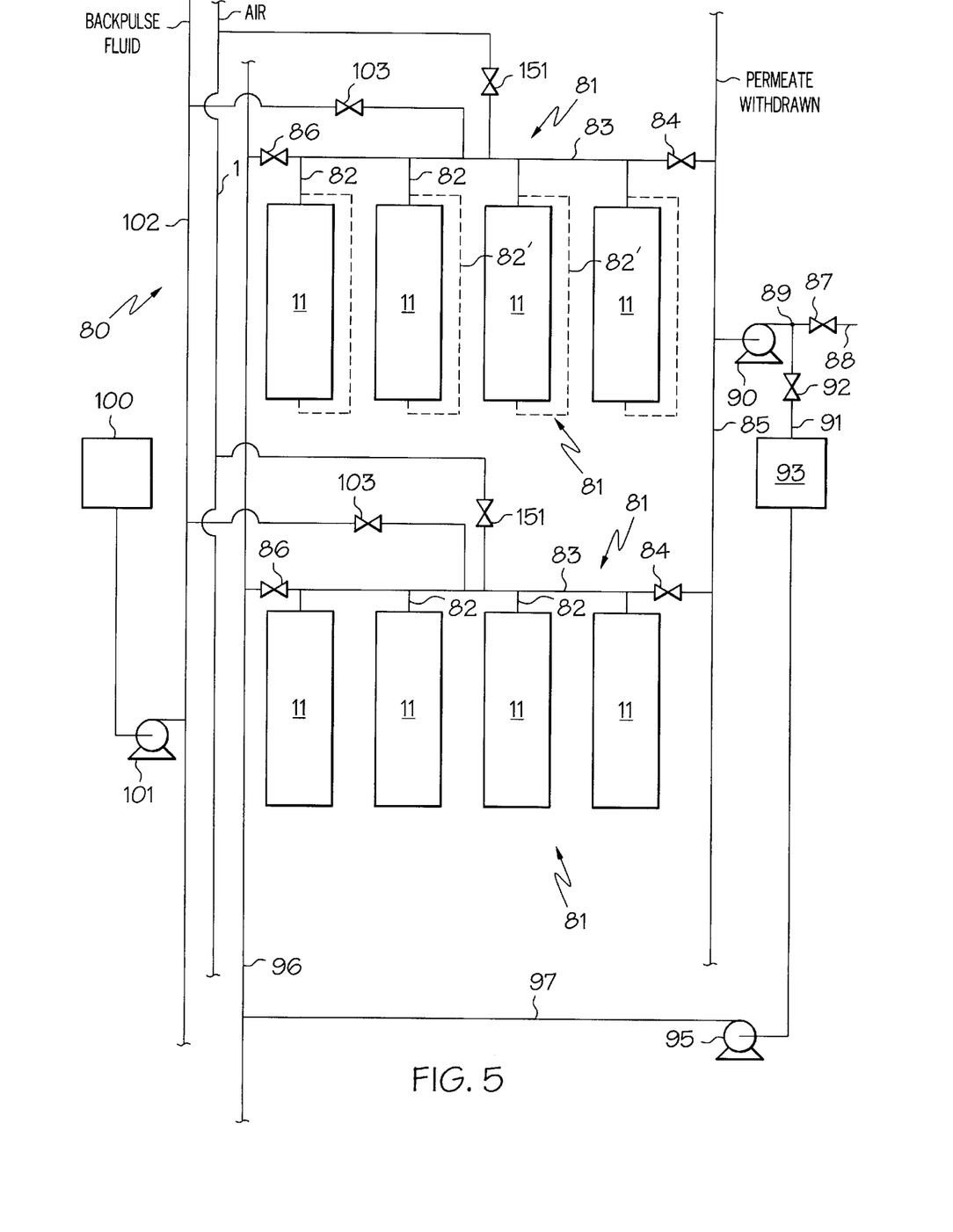
FIG. 5 is a process flow diagram schematically illustrating only two of numerous racks of a bank of racks, each rack including four cassettes; each rack may be isolated for an ancillary operation other racks produce permeate; a cleaning system separate from the back-pulsing system is illustrated.

Referring to FIG. 5 there is schematically illustrated a single bank 80 of a novel 28 MM L/day system, which bank which includes 12 racks 81 only two of which are shown. Each rack has 4 cassettes 11 (see FIG. 3), and each cassette has 8 skeins each having a membrane area of 60 $m^2$ (645 $ft^2$). Permeate withdrawn from lower headers through un-valved CPMs 82' is coupled with that withdrawn from the upper headers in un-valved CPMs 82. Each manifold 82 is manifolded to a RPM 83 connected at one end, through an AV 84, to MPM 85; and at the other end, through an AV 86, to a back-pulse manifold 96. AVs 84 and 86 place the cassettes 11 of each rack 81 in selective fluid communication with a permeate pump 90 into which permeate flows through MPM 85. Permeate is discharged through discharge line 88 which is provided with a tee 89 to return permeate through conduit 91 to a back-pulse tank 93. AV 87 on discharge line 88 may be closed to divert all the permeate to the back-pulse tank and fill it quickly. AV 87 is a large valve which takes 15 sec to open and 15 sec to close. AV 92 shuts off flow of permeate into the back-pulse tank 93 when it is full. The size of valve 92 is dictated by the amount of back-pulsing fluid required for each rack and the rate at which the back-pulse tank is to be replenished. Suction line 94 provides permeate to back-pulse pump 95.

In the permeate withdrawal mode, permeate flows through rack permeate headers 81 into main manifold 85 from all racks with rack valves 84 open, and rack valves 86 and ancillary valves 103 (when a separate chemicals cleaning system is desired) closed. Permeate is discharged from the permeate pump 90 into a permeate distribution network. Valves 84 and 86 are relatively small ATVs which take up to 5 sec to open and 5 sec to close.

Back-pulse tank 93 holds permeate which is pumped through conduit 91, when permeate discharge valve 87 is closed, to replenish the tank. Valve 92 is a medium-size valve smaller than valve 87 which takes up to 15 sec to open and up to 15 sec to close. The quantity of permeate required to back-pulse a single rack being a relatively much smaller amount than that required to back-pulse several racks together, only one rack is back-pulsed while the others continue to produce permeate.

When a rack is to be back-pulsed, AV 84 of that rack is closed, and the discharge from pump 95 through discharge line 97 is directed into the isolated rack through its open AV 86. The discharge line 97 selectively communicates with all racks 81 through AVs 86. All other rack valves 86 remain closed while the other racks produce permeate drawn through open rack valves 84. After the chosen amount of back-pulse fluid is pumped through the modules of the isolated rack, rack valve 84 is opened and valve 86 is closed so that rack 81 returns to the production of permeate. The remaining racks can be back-pulsed in sequence without turning off the pump 95, simply by opening and closing rack vales 84 and 85 as appropriate for each rack.

The number of racks in a bank is typically determined by the period of a filtration cycle which includes a production period and a non-production period. The production period is determined by the optimum permeate production over a 24 hour period during which the membranes are to be back-pulsed or otherwise treated several times.

A typical filtration period is 15 min, including a back-pulse period of 30 sec.; in addition the non-production period includes the time required to switch the positions of appropriate on/off valves from open to shut, and vice versa (15 sec each switchover for rack valves, two switchovers for each cycle). Net production time is therefore 840 sec out of 900 sec. All on/off valves on the RPMs and on the other larger conduits are necessarily automatic.

In addition to back-pulsing, fibers are periodically chemically cleaned (maintenance cleaning) and tested for leaks (integrity testing), each of which functions is to be included in the non-production (non-filtration) period.

A chemicals tank 100 holds cleaning concentrate which is pumped through pump 101 into chemicals manifold 102, branches of which are teed into the RPM 83 of each rack 81. When skeins in a cassette of a particular rack are to be cleaned, that rack is isolated for back-pulsing by closing valve 84. While permeate is pumped through open valve 86, an automatic on/of valve 103 opens and injects concentrate into the manifold 83. When the cleaning cycle is over, valves 86 and 103 are closed and valve 84 is opened to commence a permeate production cycle. If desired, the chemical cleaning solution may be added in concentrated form to the back-pulse tank 93 with a chemical solution pump 103 through conduit 104 in which an on/off valve 105 is provided.

It has been found that an entire rack may be tested to determine the existence of a single incision in a single fiber. The ability to conduct a meaningful integrity test on a single rack is an essential object of this invention. It was not apparent that testing a rack would provide sufficient accuracy and sensitivity of the test. Being able to continue production of permeate from other racks while integrity testing allows frequent testing.

To integrity test a rack, branches of an air line 140 are teed into each rack manifold 83. Each air line is provided with an automatic on/off air valve 141 to pressurize the fibers in each rack. Prior to testing for defects, valves 84, 86 and 103 are closed and then air valve 141 is opened. Valve 141 is closed except when integrity testing.

The filtration period is a function of the specific substrate being filtered, the specific membrane used, and the required specifications of the permeate. Details of various membranes which may be used in modules are presented in the aforementioned '039 and '607 patents and references cited therein.

Allowing for an operating margin so as to allocate 1 min for each ancillary period, the maximum number of racks for sequential switchovers of racks with a filtration cycle of 15 min, is 15.

Figure 6:
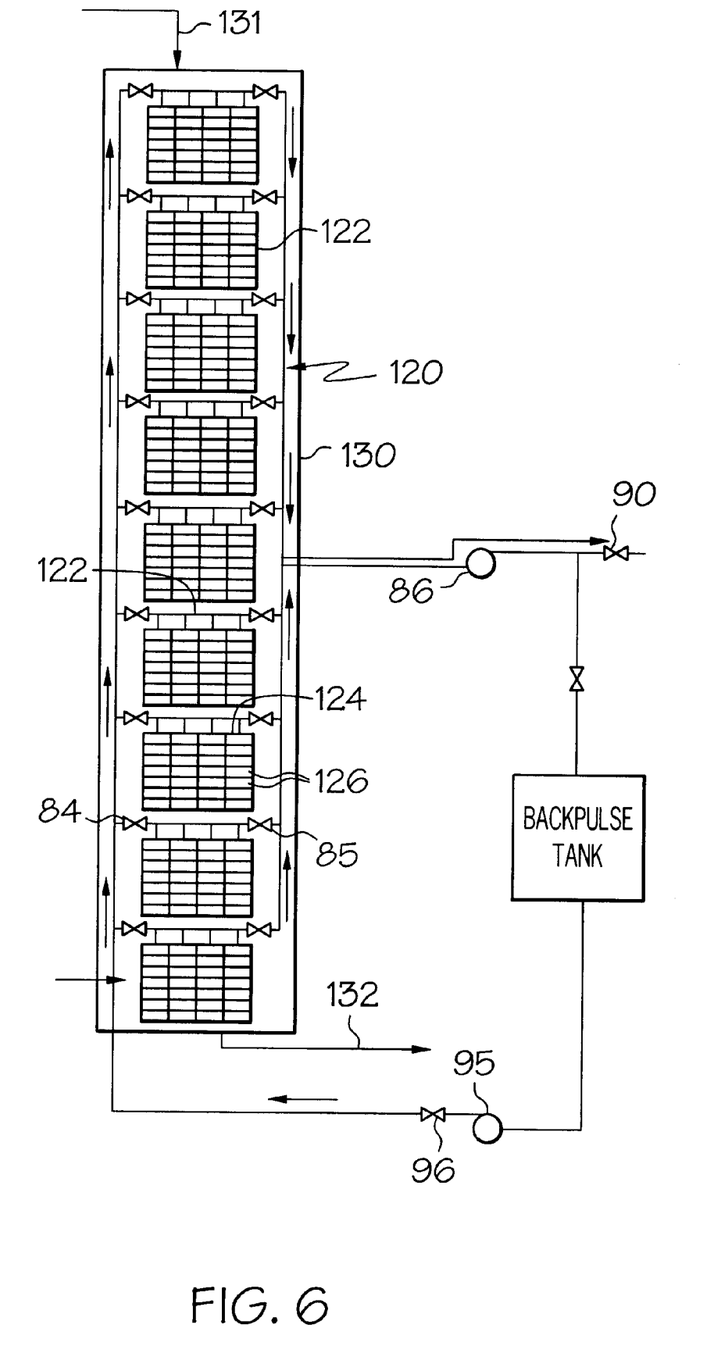
FIG. 6 is a plan view schematically illustrating a large filtration plant provided with a single bank of plural racks connected for parallel operation, all racks operating to produce permeate continuously except when one or more individual racks are isolated for an ancillary function.

Referring to FIG. 6 there is schematically illustrated a bank, indicated by reference numeral 120, of 9 racks each identified by reference numeral 122, such as are illustrated in FIG. 4; each rack includes 4 cassettes each identified by reference numeral 124, each cassette including 8 vertical skeins each identified by reference numeral 126. The bank is immersed in a tank 130 which is fed through feed conduit 131; concentrate is purged through purge conduit 132. As in FIG. 5, the bank is provided with corresponding permeate and back-pulse pumps, back-pulse tank, chemical cleaning tank, and air line for integrity testing (not shown for clarity) and on/off valves to provide the functions described in FIG. 5. It will be evident that the permeate pump and back-pulse pump may be operated continuously which provides longevity for the motor. Further, despite only two AVs per rack, permeate may be withdrawn from both ends of long fibers, and they may be back-pulsed and cleaned from both ends making for minimal pressure drop and efficient operation.

When a single one of the 9 racks is isolated for back-pulsing, 11.1% of the bank is isolated. If in addition, a second rack is isolated for integrity testing, then 22.0% of the bank is isolated. For sequential operation of a bank of 15 racks for each of which a 1 minute interval is provided for an ancillary function, 15 racks may be used. When only one rack is isolated, 6.66% of the bank is isolated. The less time accorded for an ancillary function, and the smaller the racks, the more time is available for production of permeate and smaller AVs may be used which are quicker opening and closing.

If desired, two or more of the racks may be isolated simultaneously for an ancillary function. For example, one rack may be isolated for once-a-day integrity testing while another may be isolated for routine back-pulsing every 15 min. as long as at least one, but preferably the majority of the racks are producing permeate.

In another embodiment in which even fewer rack valves are required, permeate is collected by siphoning it under gravity from modules operated at minimal flux and pressure, in one or more banks, so that they may be operated for a much longer period than is possible by operating the membranes at maximum (or nominal) flux. Operation at very low flux and pressure minimizes fouling. The permeate collection headers from each bank are connected to a common wet well through a siphon arrangement. Air is withdrawn from the permeate collection headers by a vacuum pump to generate a siphoning effect. The transmembrane pressure required for filtration corresponds to the difference between the water levels in the membrane tank and the wet well. Upon evacuating air from the permeate collection headers, permeate flows into the lumens of the fibers under gravity.

As a result, permeate flows into a wet well, typically about 10 meters (32.8 ft) deep, which is deep enough to overcome both the transmembrane pressure and losses due to pressure drop in the permeate collection headers, so as to generate the desired siphoning effect. It will be appreciated that the maximum siphoning effect will be generated when the differential head of water is equivalent to one atmosphere, so that the wet well is preferably deep enough not only to provide the desired differential head, but also to store permeate which is not immediately withdrawn from the well. Because flow of permeate is self-regulating, complicated controls are unnecessary. Permeate is pumped from the wet well into the distribution network by a set of high pressure pumps which are controlled by demand. In a large system comprising plural trains operating in parallel, when demand is low and the wet well is full, one or more trains may be shut down.

Thus, a gravity-operated system of at least one bank is operated by connecting multiple cassettes for operation in parallel in a rack each cassette comprising plural modules comprising hollow fibers; connecting multiple racks for operation in parallel in a bank of racks; isolating from about 6 to 50 percent of modules in a bank for a predetermined period of time to perform an ancillary operation; providing a wet well to collect permeate; generating a siphoning effect by removing air from the bank's permeate collection header until the transmembrane pressure and losses due to pressure drop in the permeate collection headers is overcome, and, continuously withdrawing permeate from racks left unisolated.

Figure 7:
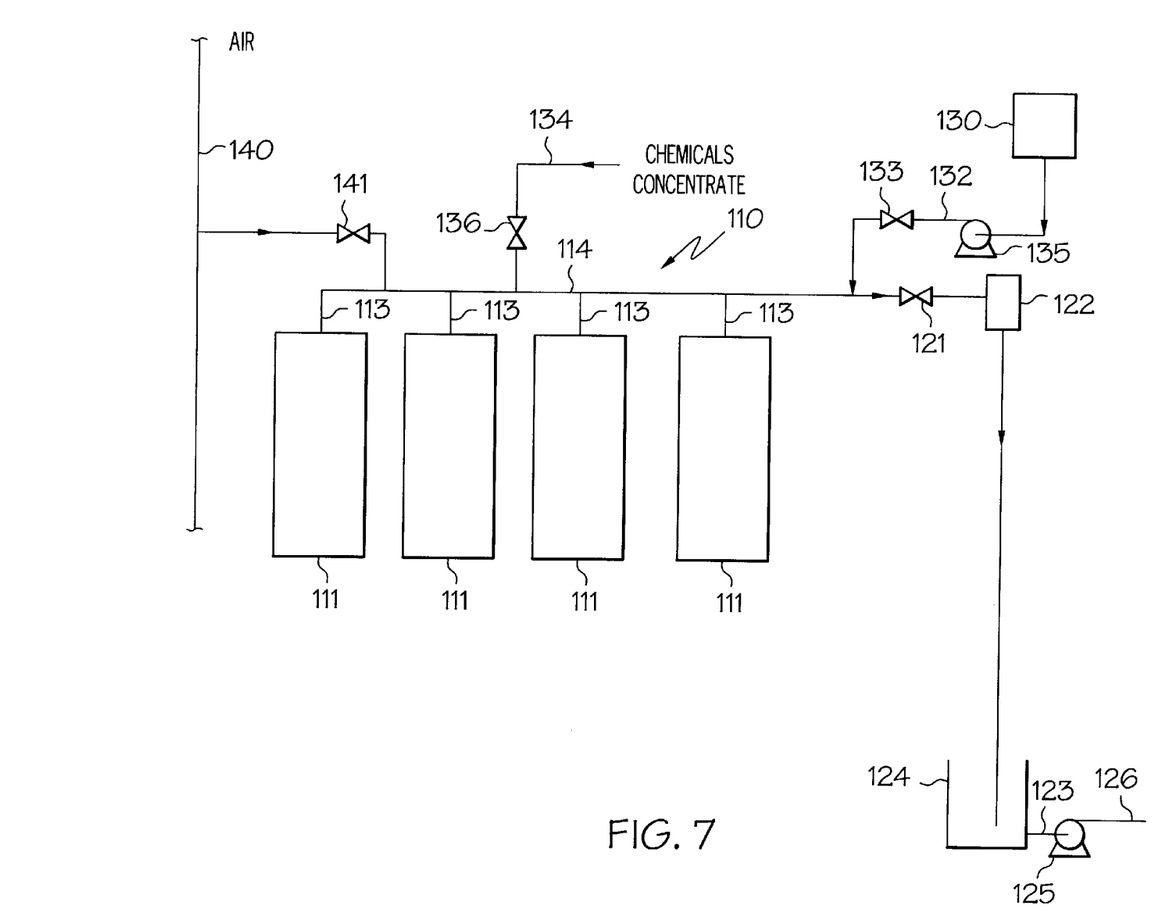
FIG. 7 is a process flow diagram of the invention schematically illustrating a single rack from which withdrawal of permeate relies on gravity and a siphoning effect created by using a deep wet well.

Referring to FIG. 7 illustrates a single rack indicated generally by reference numeral 110, including 4 cassettes 111 of the "gravity flow" system. Permeate to be withdrawn is combined from each cassette in CPMs 113 which combine the separate discharges from both the upper and lower headers (the coupling loop is not shown). Each manifold 113 is manifolded to a RPM 114 through which permeate is led through an AV 121 to a vacuum generating means 122 such as a pump or steam eductor which generates a sufficient vacuum in the RPM 114 to withdraw permeate into wet well 124 where it is discharged through discharge line 123. Pump 125 discharges permeate through distribution main 126 into a permeate distribution network. A back-pulse tank 130 is refilled with permeate as necessary (as shown in FIG. 5) and the rack is back-pulsed through back-pulse conduit 132 by back-pulse pump 135. The conduit 132 is provided with an automatic on/off valve 133 which is closed when the rack is in the permeate production mode.

Each rack is isolated and back-pulsed in sequence, and isolated and cleaned or tested for integrity as required, as described hereinabove. When the rack is to be back-pulsed, valve 121 on the rack manifold 114 is closed, and also valves 136 and 141. Valve 133 is then opened and the rack back-pulsed.

As before, it is desirable to provide the rack 110 with a chemical concentrate for maintenance cleaning which is pumped, when required, through chemicals conduit 134 which is provided with AV 136. Back-pulse tank 130 provides permeate pumped through conduit 132 by back-pulse pump 135, and conduit 132 is valved with on/off valve 133. For integrity testing, an air line 140 supplies air which is used to pressurize the fibers in the skeins when AV 141 is opened.

Figure 8:
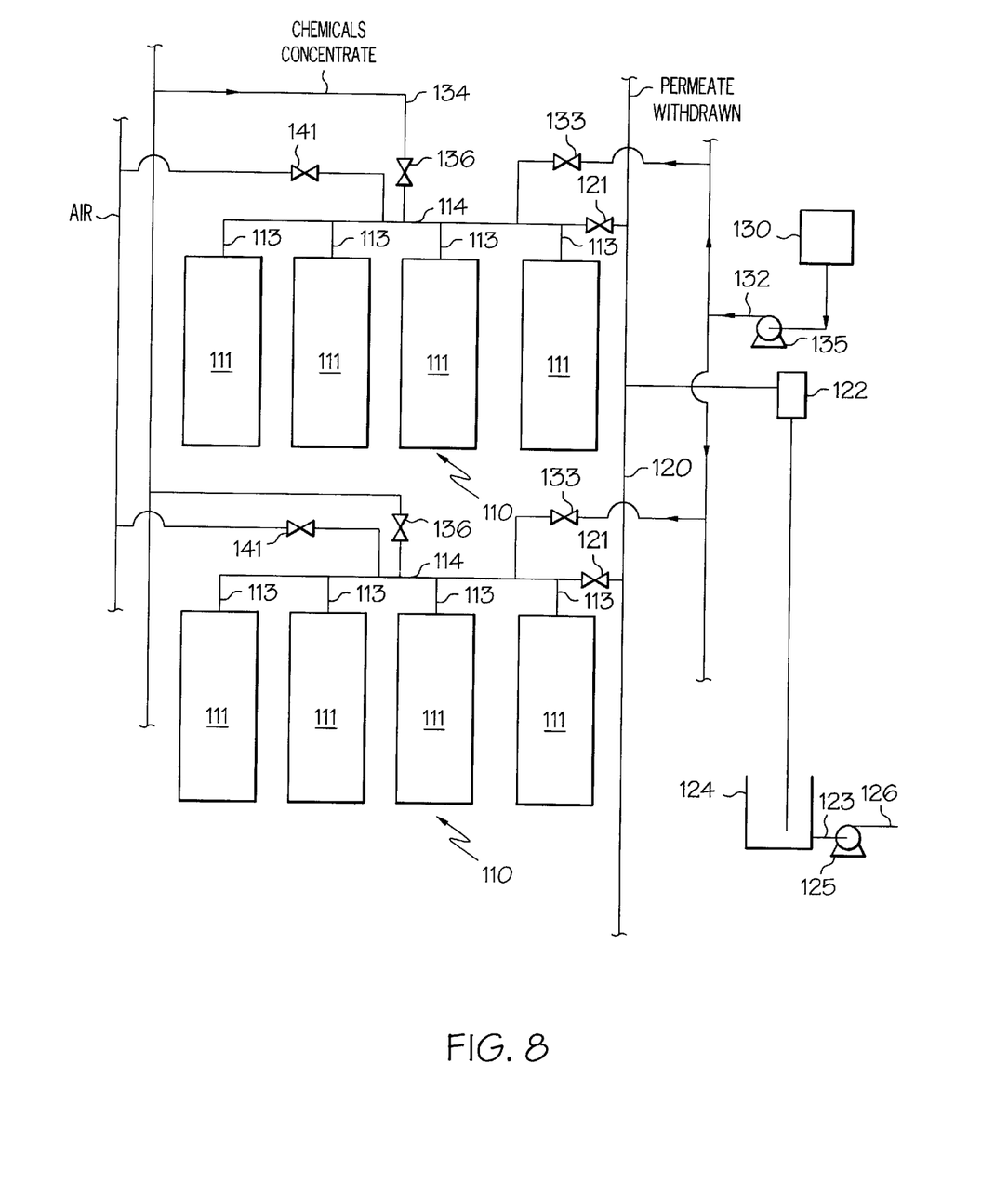
FIG. 8 is a process flow diagram of the invention schematically illustrating plural racks in a bank similar to one shown in FIG. 5 except that withdrawal of permeate relies on gravity and a siphoning effect created by using a deep wet well.

Referring to FIG. 8 the "gravity flow" system comprises a bank of plural racks 110 only two of which are shown connected in parallel, each rack including 4 cassettes 111. Permeate to be withdrawn is combined from each cassette in CPMs 113. Each manifold 113 is manifolded to a RPM 114 through which permeate is led to a MPM 120 through an automatic on/off valve 121 to vacuum pump 122, as above in FIG. 6, and permeate is withdrawn into wet well 124 where it is discharged as described.

Each rack is isolated and back-pulsed in sequence utilizing equipment described in FIG. 7, and isolated and cleaned or tested for integrity as required, as described hereinabove. In each rack in the permeate production mode, only valve 121 is open. When a specific rack is to be back-pulsed, it is isolated by closing valve 121 on the rack manifold 114, and valves 136 and 141. Valve 133 is then opened and the rack back-pulsed.

It will now be evident that the benefits of not having to purchase, operate and maintain a large number of automatic control valves for individual skeins in clusters, is unexpectedly great. Savings with fewer AVs realized due to grouping skeins into cassettes for a large plant, and cassettes into racks in an even larger plant makes the difference between a plant being theoretically operable and practically commercial.

Set forth in the Comparison Table below is a side-by-side comparison of the Chmiel configuration with its emphasis on isolating individual skeins and that of this invention for a large plant producing 28 MM L/day (7.5 MM gal/day) permeate. Each configuration uses the same number (288) of ZW-650 UF skeins each having a membrane area of about 60 m$^2$ (650 ft$^2$). Each skein operates at a flux of 60 LMH (40 gal/ft$^2$/day). Each cassette has 8 ZW-650 UF skeins. The same number of ZW-650 UF skeins and cassettes are grouped into 9 racks, each having 8 cassettes.

Assume a cycle period of 15 min, with 30 sec for back-pulsing and 14.5 min filtration. The 14.5 min for filtration includes 15 sec for opening and closing the appropriate AVs. In the Chmiel configuration, as illustrated in his FIG. 1 or 2, irrespective of how he clusters the skeins, since a cycle is 15 min, he must program the AVs of 20 skeins (288 skeins divided by 15 min/cycle), two AVs on each skein (a total of 40 AVs). AVs on about 20 skeins must open and close essentially simultaneously in the back-pulse portion of the cycle, while the remaining 268 skeins are in the production mode.

For the same 15 min cycle period, with 30 sec for back-pulsing, when the 288 skeins are grouped into 36 cassettes (36 cassettes divided by 15 min/cycle), each cassette with two AVs, the AVs on 3 cassettes (total of only 6 AVs) are required to open and close essentially simultaneously.

For the same 15 min cycle period, with 30 sec for back-pulsing, when the 288 skeins are grouped into 36 cassettes, and the 36 cassettes are grouped into 9 racks, only 2 AVs are required to open and close essentially simultaneously because only a single rack need be back-pulsed.

It will now be evident that the operation of a multiplicity of AVs reliably at precise intervals is surprisingly simplified when individually unvalved skeins are grouped for operation into cassettes, and for a larger plant, when the cassettes are grouped into racks. Not only are fewer valves required, greatly reducing the capital cost of the plant, but the reliability and simplicity of operating fewer AVs makes the difference between a filtration plant with manageable maintenance requirements, and a plant in which those requirements are not.

| COMPARISON TABLE | | | |
|---|---|---|---|
| Configuration | Chmiel | Cassettes | Racks |
| No. of banks | 1 | 1 | 1 |
| No. of skeins | 288 | 288 | 288 |
| No. of cassettes | None | 36 | 36 |
| No. of racks | None | None | 9 |
| No. of AVs | 576 | 72 | 18 |

From the foregoing comparison it is evident that grouping skeins in either "cassettes" or "racks" requires purchasing and operating several-fold fewer AVs than required in the Chmiel configuration, and that grouping will effect substantial savings.

We claim:

1. In a large plant comprising a bank of multiple cassettes for filtering a contaminated substrate, immersed in said substrate, and in open fluid communication with each other, each cassette comprising a multiplicity of membrane modules connected for operation in parallel in the cassette, a method comprising, connecting said multiple cassettes having a total of at least 100 modules, for operation in parallel in said bank without selectively isolating any module thereof;

isolating at least one cassette in said bank for a predetermined period of time sufficient to execute an ancillary operation with said cassette; and, continuously withdrawing permeate from said bank and from said cassettes left unisolated.

2. The method of claim 1 wherein each said module has a membrane area of at least 10 $m^2$ and comprises fibers greater than 0.5 meter long; and, providing one automatic cassette valve on a manifold in each cassette to control withdrawal of permeate from modules in each cassette, and to control flow of back-pulsing fluid into modules in each cassette, respectively.

3. The method of claim 2 including isolating from 6 percent to 50 percent of the cassettes in said bank to provide at least one isolated cassette; and, said ancillary operation comprises flowing a back-pulsing fluid through said isolated cassette.

4. The method of claim 3 wherein said back-pulsing fluid is selected from the group consisting of permeate, air and a mixture thereof.

5. The method of claim 2 wherein said ancillary operation includes flowing a chemical cleaning fluid through modules in from 1–2 cassettes while remaining cassettes remain in a permeate production mode.

6. The method of claim 2 wherein said ancillary operation includes pressurizing said modules in an isolated cassette with a pressurizing gas while substantially all remaining cassettes remain in a permeate production mode.

7. The method of claim 6 comprising measuring pressure decay to determine whether a membrane is defective.

8. The method of claim 2 comprising, connecting said cassette manifolds to a vacuum generating means;

exerting a sufficient vacuum in said cassette manifold to withdraw permeate therein, said manifolds each having an automatic valve to shut off flow of said permeate when said modules in said cassette are to be back-pulsed;

discharging permeate into a wet well;

isolating at least one cassette in said bank for a predetermined period of time sufficient to execute an ancillary operation with said cassette;

providing means to back-pulse said modules with back-pulsing fluid; and, discharging permeate from said wet well.

9. The method of claim 8 wherein, once started, flow of permeate from said bank of cassettes is self-regulating.

10. In a large plant a bank comprising a bank of racks for filtering a contaminated substrate, immersed in said substrate, and in open fluid commuication with each other, each rack comprising a multiplicity of membrane modules connected for operation in parallel in cassettes, a method comprising, connecting multiple cassettes having a total of at least 100 modules, for operation in parallel in respective racks without selectively isolating any module in said cassettes, and without selectively isolating any cassettes in said racks;

connecting multiple racks for operation in parallel in said bank of racks;

isolating at least one rack in said bank for a predetermined period of time sufficient to execute an ancillary operation with said rack; and, continuously withdrawing permeate from said bank and said racks left unisolated.

11. The method of claim 10 wherein each said module has a membrane area of at least 10 $m^2$ and comprises fibers greater than 0.5 meter long; and, including connecting said multiple cassettes to cassette manifolds and connecting said cassette manifolds to rack manifolds connecting said rack manifolds to a main manifold; and, providing one automatic rack valve on each rack manifold to control withdrawal of permeate from cassettes in each rack, and to control flow of back-pulsing fluid into cassettes in each rack, respectively.

12. The method of claim 11 including isolating from 6 percent to 50 percent of the racks in said bank to provide at least one isolated rack; and, said ancillary operation comprises flowing a back-pulsing fluid through said isolated rack.

13. The method of claim 12 wherein said back-pulsing fluid is selected from the group consisting of permeate, air and a mixture thereof.

14. The method of claim 11 wherein said ancillary operation includes flowing a chemical cleaning fluid through membrane modules in from 1–2 racks while remaining racks remain in a permeate production mode.

15. The method of claim 11 wherein said ancillary operation includes pressurizing said isolated rack with a pressurizing gas while remaining racks remain in a permeate production mode.

16. The method of claim 15 comprising measuring pressure decay to determine whether a membrane is defective.

17. The method of claim 11 comprising, connecting said rack manifolds to a vacuum generating means;

exerting a sufficient vacuum in said cassette rack manifold to withdraw permeate therein, said rack manifolds each having an automatic valve to shut off flow of said permeate when said modules in said rack are to be back-pulsed;

discharging permeate into a wet well;

isolating at least one rack in said bank of racks for a predetermined period of time sufficient to execute an ancillary operation with said rack;

providing means to back-pulse said modules with back-pulsing fluid; and, discharging permeate from said wet well.

18. The method of claim 17 wherein, once started, flow of permeate from said bank of racks is self-regulating.

19. A large filtration plant comprising a bank of multiple cassettes for the production of permeate flowing immersed in a reservoir of substrate to be filtered, comprising, said bank including a total of at least 100 modules of fibers, said modules connected in open fluid communication for operation in parallel in cassettes;

said multiple cassettes being connected in open fluid communication with a cassette manifold and each other, and connected for operation in parallel in said bank;

multiple, automatically actuated on/off valves including two cassette valves to selectively control flow of fluid through said cassette manifold; and, means to selectively open and close said automatically actuated on/off valves to isolate a cassette so as to continuously withdraw permeate from said bank.

20. The filtration plant of claim 19 including, vacuum generating means to exert a sufficient vacuum in said cassette manifold to generate flow of permeate into said modules, and, a wet well in which permeate is collected.

21. The filtration plant of claim 19 wherein, said multiple cassettes are connected in open fluid communication with each other, and also with a rack manifold, for operation in parallel in a bank or racks comprising at least two racks;

multiple, automatically actuated on/off valves include two rack valves to selectively control flow of fluid through said rack manifold; and, means to selectively open and close said automatically actuated on/off valves to isolate a rack.

22. The filtration plant of claim 21 including, vacuum generating means to exert a sufficient vacuum to generate flow of permeate into said modules; and, a wet well in which permeate is collected.

* * * * *